United States Patent [19]
Whipp et al.

[11] Patent Number: 5,720,926
[45] Date of Patent: Feb. 24, 1998

[54] APPARATUS FOR REMOVING A CONTAMINANT FROM A GAS

[75] Inventors: Gary Whipp, Québec; Denis Chouinard, Stoneham; Josee Ethier, Québec; Benoit Roy, Québec; Veronique Roy, Cap-Rooge; Belhocine Benallal, Sainte-Poy, all of Canada

[73] Assignee: Environair S.I.P.A. Inc., Quebec, Canada

[21] Appl. No.: 551,656

[22] Filed: Nov. 1, 1995

[51] Int. Cl.$^6$ ............... G05D 7/00; B01D 50/00; B01D 53/34
[52] U.S. Cl. ............... 422/110; 422/111; 422/177; 422/211; 422/234; 95/8; 95/9; 95/187; 55/228; 55/229; 261/197
[58] Field of Search ............... 422/111, 110, 422/177, 211, 234; 95/8, 9, 187; 55/228, 229; 261/197; 423/249, 242

[56] References Cited

U.S. PATENT DOCUMENTS

| | | | |
|---|---|---|---|
| 3,967,937 | 7/1976 | Hobbs | 95/187 |
| 3,989,465 | 11/1976 | Onnen | 95/187 |
| 4,589,889 | 5/1986 | Spencer | 55/48 |
| 4,836,991 | 6/1989 | Ishiguro et al. | 423/242 |
| 5,168,065 | 12/1992 | Jankura et al. | 436/55 |
| 5,538,707 | 7/1996 | McAlister | 423/552 |
| 5,540,760 | 7/1996 | Risse et al. | 95/195 |

FOREIGN PATENT DOCUMENTS

| | | | |
|---|---|---|---|
| 60-110320 | 6/1985 | Japan | |
| 504546 | 5/1976 | U.S.S.R. | |
| 582816 | 12/1977 | U.S.S.R. | |
| 626038 | 9/1978 | U.S.S.R. | |
| 2 040 271 A | 8/1980 | United Kingdom | |

OTHER PUBLICATIONS

Patent: SU 000504546A Absorption Process Automatic Control, Josee Ethier, P. (English translation of Abstract).
Patent: SU 000582816A Absorption Column Circulating Solution Acidity Automatic Regulator—Has Additional pH . . . Josee Ethier, P. (English translation of Abstract).
Patent: SU 000626038A Exhaust Gas Cleaning During Sulfuric Acid Production, Josee Ethier, P. (English translation of Abstract).

Primary Examiner—Nina Bhat
Attorney, Agent, or Firm—Ratner & Prestia

[57] ABSTRACT

An apparatus for removing a contaminant from a gas effluent. The apparatus comprises an absorption tower in which is placed a suitable packing where the gas effluent and contaminant-absorbing liquid contact one another. A recirculation path transfers spent contaminant-absorbing liquid to the top of the tower allowing the liquid to effect a new contaminant-removal cycle. Reagent is introduced in the recirculation path to refresh the contaminant-absorbing liquid. A dual-controller system dynamically varies the amount of reagent introduced in the recirculation path in accordance with the amount of contaminant in the gas effluent. A master controller calculates a reagent concentration set-point. The set-point is communicated to a slave controller that meters reagent in the recirculation path according to the set-point value.

8 Claims, 1 Drawing Sheet

APPARATUS FOR REMOVING A CONTAMINANT FROM A GAS

FIELD OF THE INVENTION

The present invention relates to the art of gas purification and more particularly to an apparatus for removing a contaminant from a gaseous effluent and to a process thereof.

BACKGROUND TO THE INVENTION

Many industrial processes generate gaseous effluents contaminated with by-products, like ammonia ($NH_3$), chlorine ($Cl_2$), hydrochloric acid (HCl), nitrogen oxides ($NO_x$), sulfur dioxide ($SO_2$), carbon monoxide (CO), hydrogen sulfide ($H_2S$) and many others. Those contaminants need to be eliminated from the effluent before it is released into the atmosphere.

The combustion of hydrocarbons is a common industrial operation that generates a contaminated gaseous effluent. The concentration and the nature of the contaminant vary with the combustion conditions like flame temperature, stoichiometric ratio of air/hydrogen, nature of the combustible (coal, oil, natural gas, etc.) and their contaminant content. Contaminants which are typically produced by hydrocarbon combustion include sulfur oxides ($SO_x$), nitrogen oxides ($NO_x$), carbon monoxide (CO). Products like ammonia ($NH_3$), hydrogen sulfide ($H_2S$) and chlorine come from various processes used in the manufacturing industries. Hydrochloric acid (HCl) is also a contaminant which is fairly common and which needs to be eliminated.

Absorption towers are typically used for cleaning gas or removing a contaminant from gas effluents. Absorption towers operate by contacting contaminated gas with a contaminant-absorbing liquid which takes-in the contaminant. The contaminant-absorbing liquid normally includes water and a reagent which is specific for the contaminant to be removed from the gas effluent. Absorption towers operate in a temperature range which depends upon the nature of the gas stream and materials employed for constructing the tower.

In general, absorption towers are operated countercurrently, i.e., the gas and contaminant-absorbing liquid travel in opposite directions. The contaminant-absorbing liquid which contains the reagent is introduced at the top of the tower and it is distributed through the packing to form a film. By forming a film of liquid the packing increases the gas/liquid surface contact area (the surface between the contaminant-absorbing liquid and the gas phase where exchange occurs). The packing is also designed as to minimize the pressure drop of the gaseous phase flowing through the tower. The pressure drop is typically 0.25 to 1 inch of $H_2O$ for every foot of packing. Different types of packing are commercially available for absorption towers. Usually the packing is chosen according to its physical characteristics and process behaviour as to obtain contaminant removal efficiency that could reach 99% or even more.

The contaminated gas is introduced at the bottom of the tower. While the gas stream flows through the tower the contaminant which is in contact with the contaminant-absorbing liquid is absorbed by it, and reacts with the specific reagent to form a salt. The spent contaminant-absorbing liquid containing the salt accumulates at the bottom of the tower.

A slip stream is continuously evacuated from the bottom of the tower to eliminate the salt build-up. The rest of the liquid is recirculated to the top of the tower to undergo another contaminant removal cycle. The slip stream conduit and the recirculating conduit are both connected to the bottom of the tower. The residence time of the contaminant-absorbing liquid at the bottom of the absorption tower can be from 3 to 10 minutes depending on the design of the system. In comparison, the residence time of the contaminant-absorbing liquid in the recirculating loop is around 2 to 4 seconds.

In a typical prior art tower, fresh reagent is added to the system continuously to compensate for the reagent consumption. The rate at which the reagent if added to the liquid is proportional to the contaminant removal rate. In commercially available absorption towers, fresh reagent is metered to the contaminant-absorbing liquid by a simple loop control system. The parameter on which the control is based is normally a pH reading, if the reagent is an acid or a base, or an oxyde-reduction potential (ORP) reading, if the reagent is an oxidant or a reductor, which are measured at the bottom of the tower. The slip stream is withdrawn from the bottom of the tower. The fresh reagent is also added at this point of the process. Therefore, the current practice is to adjust the added rate of the reagent as to reach a set point which corresponds to an excess of reagent in the liquid phase. With this practice, small to medium fluctuations of the contaminant concentration in the gas phase will be overcome by the reagent excess. The efficiency of the process will then remain quite constant to reach up to 99% contaminant removal from the gas stream, but some unused reagent is withdrawn with the slip stream.

The set point is fixed according to the maximal contaminant concentration in the gas stream expected during normal operation. The controller observes the pH value or the ORP value of the contaminant-absorbing liquid at the bottom of the tower and tries to maintain that value at the predetermined set point by varying the rate of reagent injection.

The main drawback of the prior art systems is their inability to respond to any variations in the concentration of the contaminant carried by the gaseous effluent. As a consequence, the absorption tower can be only operated at near peak contaminant removal efficiency by using an overly rich reagent mixture to compensate for transient increases of the contaminant concentration that the system cannot detect. This conservative mode of operation may not be acceptable because reagent is withdrawn at a high concentration in the slip stream which translated into higher operating costs. The alternative is to use a leaner reagent concentration. As such, the system becomes more efficient in terms of reagent utilisation because most of the time it operates near the ideal reagent stoichiometric ratio. However, the contaminant removal efficiency of the system can no longer be maintained near the optimum level particularly when the concentration of the contaminant in the gas effluent varies.

OBJECTS AND STATEMENT OF THE INVENTION

It is an object of the present invention to provide an apparatus which responds to variations in the concentration of a contaminant carried by a gaseous effluent.

It is a further object of the present invention to provide an apparatus which reduces the amount of unused reagents and can therefore operate at a lower cost.

As embodied and broadly described herein, the invention provides an apparatus for removing a contaminant from a gas, said apparatus comprising:

a casing defining a processing zone for receiving contaminated gas and contaminant-absorbing liquid, the contaminated gas and the contaminant-absorbing liquid flowing in substantially opposite directions through said processing zone and contacting one another for causing removal of impurities from the contaminated gas;

said processing zone including an inlet allowing contaminant-absorbing liquid to ingress said processing zone and an outlet allowing contaminant-absorbing liquid to egress said processing zone;

a recirculation path between said outlet and said inlet;

a pump in said recirculation path for causing transfer of contaminant-absorbing liquid from said outlet to said inlet;

a metering pump for introducing reagent in the contaminant-absorbing liquid travelling through said recirculation path, at a certain delivery point;

a control system for controlling a concentration of reagent in the contaminant-absorbing liquid entering said processing zone, said control system including:

a) a master controller that is responsive to a concentration of reagent in contaminant-absorbing liquid egressing said processing zone to derive control data; and b) a slave feedback controller communicating with said master controller for receiving the control data, said slave feedback controller being capable of processing data representative of concentration of reagent in contaminant-absorbing liquid in said recirculation path downstream of said delivery point in accordance with a certain transfer function to regulate said metering pump, said master controller providing means for altering said transfer function in accordance with the concentration of reagent in contaminant-absorbing liquid egressing said processing zone, through the control data.

In a most preferred embodiment the casing of the apparatus is vertically oriented. Contaminant-absorbing liquid is introduced at the top of the casing and flows downwardly under the effect of gravity. Contaminated gas is delivered at the bottom of the casing and rises up, thus travelling in the opposite direction with relation to the contaminant-absorbing liquid. The processing zone of the apparatus is defined by a packing whose function is to break up and scatter the flow of gas and contaminant-absorbing liquid. The height of the packing is less than the height of the casing, thus forming at the top and at the bottom of the casing empty spaces that include, in this example, the termination zones through which the contaminated gas and the contaminant-absorbing liquid flow in and out of the packing. Spent contaminant-absorbing liquid that egresses from the packing accumulates at the bottom of the casing before being pumped through a recirculation line to the top of the casing where it is introduced for a new contaminant removal cycle. Sensors monitor the pH or ORP level to determine the concentration of reagent in the contaminant-absorbing liquid egressing the packing and in the contaminant-removal liquid re-introduced in the packing. On the basis of this data, the master and the slave feedback controllers can effectively regulate the injection of fresh reagent in the recirculation line.

The advantage of this dual control loop is a fast response time which enables to control the concentration of reagent in the contaminant-absorbing liquid within a narrow range. As a result, reagent is consumed much more efficiently, without degrading the ability of the apparatus to effectively remove the contaminant from the contaminated gas.

As embodied and broadly described herein, the invention also provides a process for removing a contaminant from a gas, said process comprising the steps of:

providing a casing defining a processing zone for receiving contaminated gas and contaminant-absorbing liquid, the contaminated gas and the contaminant-absorbing liquid flowing in substantially opposite directions through said processing zone and contacting one another for causing removal of impurities from the contaminated gas, said processing zone including an inlet allowing contaminant-absorbing liquid to ingress said processing zone and an outlet allowing contaminant-absorbing liquid to egress said processing zone;

providing a recirculation path between said outlet and said inlet;

providing a pump in said recirculation path for causing transfer of contaminant-absorbing liquid from said outlet to said inlet;

providing a metering pump for introducing reagent in the contaminant-absorbing liquid travelling through said recirculation path, at a certain delivery point;

assessing a concentration of reagent in contaminant-absorbing liquid egressing said processing zone to derive control data;

producing data representative of a concentration of reagent in contaminant-absorbing liquid in the recirculation path downstream of said delivery point;

processing the data representative of a concentration of reagent in contaminant-absorbing liquid in the recirculation path downstream of said delivery point in accordance with a certain transfer function to generate a control signal;

communicating said control signal to said metering pump to regulate the delivery of reagent at said delivery point;

altering said transfer function in accordance with said control data to establish a relationship between said control signal and the concentration of reagent in contaminant-absorbing liquid egressing said processing zone.

Other objects and features of the invention will become apparent by reference to the following specification and to the drawing.

DESCRIPTION OF A PREFERRED EMBODIMENT

Figure 1:
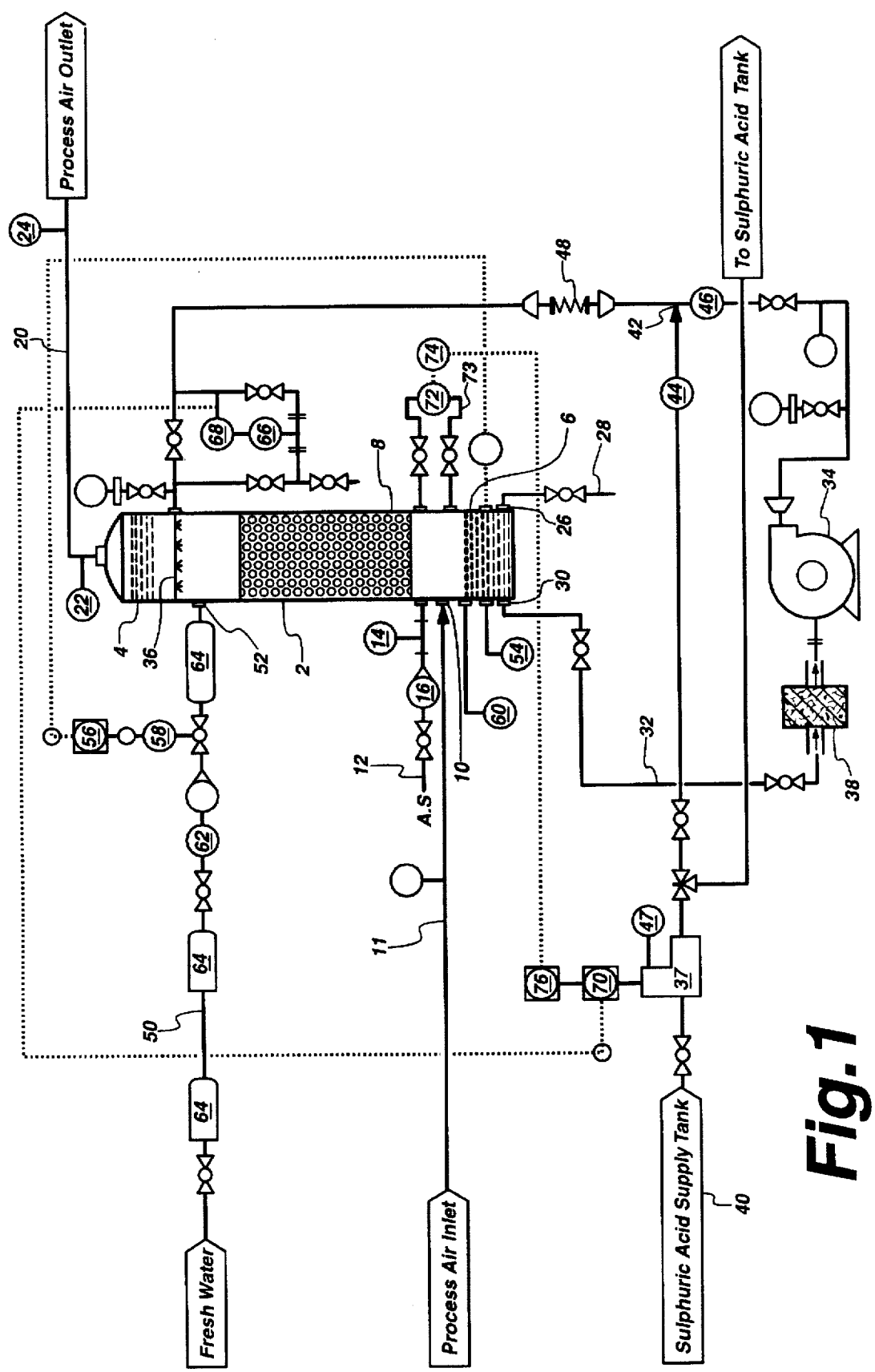
FIG. 1 is a diagram of a gas purification apparatus and of the control system thereof according to a preferred embodiment of the present invention.

Referring now to FIG. 1, the apparatus of the present invention comprises an absorption tower 2 in the form of an elongated vertical casing having a top portion 4 and a bottom portion 6. The casing receives a suitable packing 8 that breaks up and scatters the flow of gas and contaminant-absorbing liquid to increase the contact surface contaminant-absorbing liquid/gas effluent. An inlet port 10 located at the bottom portion 6 of the casing receives the contaminated gas effluent that is supplied through a conduit 11. A set of instruments are connected to the conduit 11 to provide data on the operating conditions of the absorption tower 2. The set of instruments include a pressure sensor 14 generating an electrical signal indicative of the pressure at the bottom of the absorption tower 2. The processed gas effluent egresses the absorption tower 2 at the top of the casing and it is carried away through a conduit 20. A pressure sensor 22 and a temperature sensor 24 are connected to the conduit 20.

The spent contaminant-absorbing liquid pools at the bottom of the casing. Some of that liquid is discarded through an outlet port 26 connected to a waste conduit 28. The remaining part of the liquid is directed to a recirculation line 32 through inlet port 30. The recirculation line 32 is part of a recirculation path that also includes the upper and the lower end zones of the casing (the upper end zone is the void area adjacent the inlet boundary of the packing and the lower end zone is the void area at the outlet boundary of the packing. Contaminant-absorbing liquid enters the packing from the top, through the inlet boundary, while spent contaminant-absorbing liquid egresses the packing from the bottom, through the outlet boundary), and allows to transfer the contaminant-absorbing liquid leaving the packing back to the top of the packing to undergo another contaminant removal cycle. A pump 34 in the recirculation line 32 conveys the contaminant-absorbing liquid to the top of the absorption tower. A filter 38 is provided in the line 32 between the recirculation pump 34 and the inlet port 30 to prevent solid particles suspended in the contaminant-absorbing liquid from entering the recirculation pump 34.

Fresh reagent is added to the contaminant-absorbing liquid in the recirculating line 32, downstream of the pump 34. The reagent is supplied by a metering pump 37 connected to a reagent tank 40. The recirculation line includes, downstream of the reagent delivery point 42, a check valve 46 establishing an unidirectional path of travel to prevent fresh reagent from travelling back toward the pump 34. Similarly, a check valve 44, installed in the reagent supply line, isolates the reagent metering pump 37 from the contaminant-absorbing liquid. A sensor 47 monitors the level of reagent in the tank 40 to prevent the operation of the metering pump 37 when the tank is depleted.

A static mixer 48 is located in the recirculation line, downstream of the reagent delivery point to uniformly distribute the fresh reagent in the contaminant-absorbing liquid. A pH measurement sensor 66 installed in the recirculation line downstream the reagent delivery point observes the pH level of the contaminant-absorbing liquid allowing to monitor its effectiveness as an absorbant agent for the gaseous effluent.

In order to prevent the water level from becoming too low in the bottom portion of the tower, which could damage the recirculation pump 34, the absorption tower is provided with a water supply unit. It includes a water feed conduit 50 connected to the top portion of the absorption tower at 52. A low level sensor 54, located at the bottom portion of the tower, is triggered when the water level falls below a preset level. The signal generated by the sensor is directed to a controller 56 which opens a solenoid valve 58 allowing water to enter the absorption tower. There is also provided a high level sensor 60 which activates an alarm (not shown) if the water level at the bottom of the tower is too high. The water supply unit is triggered to compensate for the amount of liquid which egresses the bottom of the tower (slip stream) and to compensate for any evaporation. It is also convenient to provide a flow meter 62 which indicates the total value of water added to the system over a predetermined period of time. The water feed conduit 50 may also comprise heating elements 64 to prevent freezing.

The operation of the absorption tower is regulated by two loop controllers which can be part of a DCS, PLC or stand along type, namely a master controller 76 and a slave controller 70. The master controller 76 receives data on the pH level in the contaminant-absorbing liquid in the absorption tower from a pH sensor 72 as will be described below. This data is indicative of the amount of contaminant present in the gaseous effluent. If the pH level observed by the sensor 72 indicates an amount of residual reagent that is too low, which may have been caused by an increase of the contaminant concentration in the gaseous effluent, the controller 76 calculates a new set point for the pH level of the fresh contaminant-absorbing liquid introduced in the absorption tower, to compensate for the increase in the contaminant.

The set point is calculated by using a proportional-plus-integral-plus-derivative (PID) algorithm. More specifically, the controller receives the pH value from the sensor 72 and compares it with its own set point stored in memory, to generate an error signal. The controller 76 will then calculate the sum of the integral of the error signal, of the derivative of the error signal and of a proportional factor. The latter is the error signal multiplied by a predetermined constant. The result of the calculation provides the new set point which is transmitted to the slave controller 70 whose primary task is to regulate the operation of the metering pump dispensing fresh reagent.

The slave controller 70 operates in the feedback loop control mode. It receives information on the reagent concentration in the fresh contaminant-absorbing liquid supplied at the top of the absorption tower, from the pH sensor 66. On the basis of this data, the controller adjusts the rate of reagent delivery to maintain the pH level as close as possible to the set point dictated by the master controller 76. The output signal issued by the slave controller 70 that determines the flow rate of the metering pump 37 is calculated by a proportional-plus-integral-plus-derivative algorithm.

A variety of control strategies may be used in the master controller and in the slave controller to regulate their outputs with relation to the inputs (pH value or ORP value). Generally speaking, the relationship between the input and the output of each controller is determined by a transfer function. In the particular example discussed above the proportional-plus-integral-plus-derivative transfer function is used in both controllers to regulate the delivery of fresh reagent. The master controller issues control data (a setpoint value in the above example) through proportional-plus-integral-plus derivative calculations, that the slave controller enforces through its own proportional-plus-integral-plus derivative strategy. In a variant, an adaptive control can be employed. Here, the control data supplied from the master controller to the slave controller is dynamically varying parameters for the proportional-plus-integral-plus derivative algorithm followed by the slave controller. In a further variant, a fuzzy control logic may be employed.

The common element of these control strategies is the generation of control data by the master controller (dynamically variable set-point, dynamically variable parameters of a transfer function or both) that alters in some way the transfer function of the slave controller. The expression "altering the transfer function" should be interpreted to mean a change of the relationship between the input and the output of the slave controller. In the example discussed above this change may be caused by supplying a new set-point, changing one or more of the parameters of the transfer function or both, in accordance with the concentration of reagent in the contaminant-absorbing liquid egressing the packing of the absorption tower.

The primary advantage of this dual-loop control system over prior art absorption towers is the ability to rapidly respond to changes in the contaminant concentration. As a result, it is no longer necessary to operate the absorption tower with contaminant-absorbing liquid overly rich in reagent to ensure a high level of contaminant removal. Less reagent needs to be introduced in the contaminant-absorbing liquid because the reagent is utilized much more efficiently. Furthermore, since the reagent is added in the recirculation path, as opposed to the bottom of the tower, part of it is not withdrawn in the slip stream which further reduces the amount of reagent needed.

A factor influencing the time of response of the system is the location of the pH sensor 72. For a faster response, the sensor should be located as close as possible to the packing. In the example shown, a portion of the spent contaminant-absorbing liquid, immediately as it egresses the packing is bled through a conduit 73 that leads to the sensor 72. The sample liquid is then directed back to the casing. Alternatively, the sensor 72 may be located in the pool of contaminant-absorbing liquid at the bottom of the casing. This may not be the optimal configuration because the larger quantity of liquid dilutes the incoming flow of spent contaminant-absorbing liquid which reduces the response time.

A specific example of the invention will now be described with reference to the annexed drawing that illustrates an absorption tower for the treatment of ammonia contaminated air using PID (proportional-plus-integral-plus-derivative) controllers. The contaminant-absorbing liquid is a mixture of water and sulfuric acid (the reagent). The person skilled in the art will appreciate, however, that a variety of other contaminants can be treated with this system, by selecting the proper reagent in accordance with the nature and concentration of the particular contaminant to be eliminated. In general the reagent may be an acid, a base, a reducing agent, or an oxidizing agent among others. For example, caustic soda may be used to eliminate hydrochloric acid (HCl), sulfur dioxide ($SO_2$) and gaseous chlorides and oxidants, like sodium hypochloride (NaOCl) and sodium sulfite ($Na_2S$), can be used to remove nitrogen monoxide, nitrogen dioxide and hydrogen sulfide. The present invention is thus not limited to any particular contaminant or reagent.

Air charged with ammonia at less than 112 ppm is introduced at the bottom of the absorption tower through inlet port 10. The air stream has a flow rate of the 30,000 actual cubic feet per minute and a temperature of approximately 70° F. At the same time contaminant-absorbing liquid, a solution of water and sulfuric acid, is introduced at the top of the absorption tower and flows under the effect of gravity within the packing. The packing has a porous structure which causes the coherent body of contaminant-absorbing liquid to spread and flow downwardly as a thin film. The contaminated air rises while being scattered by the packing and it contacts the contaminant-absorbing liquid which travels in the opposite direction. The ammonia is absorbed in the water to form ammonium hydroxide. The ammonium hydroxide then reacts with the sulfuric acid contained in the water to form a salt, namely ammonium sulfate.

The solution containing the reagent (sulfuric acid) and the resulting salt (ammonium sulfate) then continues to flow downwards. The pH sensor 72 observes the pH of the solution and transmits the measurement to the master controller 76. The reset of the solution reaches the bottom of the tower where a portion of the solution comprising the sale resulting from the reaction of the contaminant with the reagent is discarded through waste conduit 28. The remaining portion of the solution withdrawn from the tower at a flow rate of 135 USGPM is recirculated to the top of the column through the recirculation line 32. Reagent (sulfuric acid) is added to the contaminant-absorbing liquid by the metering pump 37 and the contaminant-absorbing liquid comprising water with the freshly added reagent is then re-introduced into the top portion of the absorption tower.

The rate of reagent delivery in the recirculation line 32 is determined by the feedback loop controllers 70 76, as discussed above.

The pH or ORP values measured by the sensor 72 may present some variations which are not caused by a variation of the contaminant concentration. Those fluctuations can be so rapid that they could destabilise the system by causing continuous set-point changes at the level of the slave controller. To avoid this difficulty the signal from the pH sensor 72 is conditioned by a filter (not shown in the drawings) that smooths out the signal before it is being processed by the master controller. Such filtering circuit is known in the art and it does not need to be described in detail.

The above description of a preferred embodiment should not be interpreted in any limiting manner since variations and refinements are possible which are within the spirit and scope of the present invention. The scope of the invention is defined in the appended claims and their equivalents.

The embodiments of the invention for which an exclusive property or privilege is claimed are defined as follows:

1. An apparatus for removing a contaminant from a gas, said apparatus comprising:

a casing defining a processing zone for receiving contaminated gas and contaminant-absorbing liquid, the contaminated gas and the contaminant-absorbing liquid flowing in substantially opposite directions through said processing zone and contacting one another for removing impurities from the contaminated gas;

said processing zone including an inlet allowing contaminant-absorbing liquid to ingress said processing zone and an outlet allowing contaminant-absorbing liquid to egress said processing zone;

a recirculation path between said outlet and said inlet;

a pump in said recirculation path transferring contaminant-absorbing liquid from said outlet to said inlet;

a metering pump introducing reagent, in the contaminant-absorbing liquid travelling through said recirculation path, at a certain delivery point;

a control system for controlling a concentration of reagent in the contaminant-absorbing liquid entering said processing zone, said control system including:

a) a master controller responsive to a concentration of reagent in contaminant-absorbing liquid egressing said processing zone to derive control data; and b) a slave feedback controller communicating with said master controller for receiving the control data, said slave feedback controller including means for processing data representative of concentration of reagent in contaminant-absorbing liquid in said recirculation path downstream of said delivery point in accordance with a certain transfer function to regulate said metering pump, said master controller providing means for altering said transfer function in accordance with the concentration of reagent in contaminant-absorbing liquid egressing said processing zone, through the control data.

2. An apparatus as defined in claim 1, comprising a sensor for measuring a value selected from the group consisting of pH and oxido-reduction potential (ORP) in said recirculation path downstream said delivery point.

3. An apparatus as defined in claim 1, wherein said sensor communicates with said master controller to supply said master controller with data representative of a concentration of reagent in contaminant-absorbing liquid egressing said processing zone.

4. An apparatus as defined in claim 1, comprising a first sensor for measuring a value selected from the group consisting of pH and oxido-reduction potential (ORP) and a second sensor for measuring a value selected from the group consisting of pH and ORP, said first sensor being located in said recirculation path upstream said delivery point and communicating with said master controller to supply said master controller with data representative of a concentration of reagent in contaminant-absorbing liquid egressing said processing zone, said second sensor being located in said recirculation path downstream of said delivery point and communicating with said slave controller to supply said slave controller with data representative of a concentration of reagent in contaminant-absorbing liquid downstream of said delivery point.

5. An apparatus as defined in claim 4, wherein said control data constitutes a desired set-point of reagent concentration in contaminant-absorbing liquid ingressing said processing zone.

6. An apparatus as defined in claim 5, wherein said slave controller includes processor means which compares said set-point with data generated by said second sensor to generate an error signal, said transfer function being a combination of the error signal, the integral of the error signal and the derivative of the error signal.

7. An apparatus as defined in claim 4, wherein said casing includes packing material forming at least in part said processing zone, said packing material being spaced from a lower end portion of said casing to form a space in which contaminant-absorbing liquid flowing from said packing accumulates, a void zone being defined between the contaminant-absorbing liquid accumulating in said space and a lower extremity of said packing, said first sensor contacting contaminant-absorbing liquid immediately after the contaminant-absorbing liquid egresses said packing.

8. An apparatus as defined in claim 7, wherein said reagent in contaminant-absorbing liquid is selected from the group consisting of acid, base, reducing agent and oxidizing agent.

* * * * *